United States Patent
Syed et al.

(10) Patent No.: US 11,414,138 B2
(45) Date of Patent: Aug. 16, 2022

(54) UNIBODY VEHICLE CAB BACK ASSEMBLY AND METHOD

(71) Applicant: Ford Global Technologies, LLC, Dearborn, MI (US)

(72) Inventors: Musheeruddin Zubair Syed, Farmington Hills, MI (US); Shawn Michael Morgans, Chelsea, MI (US); Steve William Gallagher, Bloomfield Hills, MI (US); Joseph R. Antoni, South Lyon, MI (US); Karen Nuler, Canton, MI (US); Scott Stanley Seashore, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 17/036,078

(22) Filed: Sep. 29, 2020

(65) Prior Publication Data
US 2022/0097778 A1    Mar. 31, 2022

(51) Int. Cl.
*B62D 33/02* (2006.01)
*B62D 33/06* (2006.01)
*B62D 25/20* (2006.01)

(52) U.S. Cl.
CPC ......... *B62D 33/02* (2013.01); *B62D 25/2027* (2013.01); *B62D 25/2036* (2013.01); *B62D 33/06* (2013.01)

(58) Field of Classification Search
CPC ............ B62D 25/2027; B62D 25/2036; B62D 25/2054; B62D 33/02; B62D 33/06
See application file for complete search history.

(56) References Cited

U.S. PATENT DOCUMENTS

| 4,188,058 | A  | * | 2/1980 | Resa ........................ | B60R 13/01 296/39.2 |
| 4,613,183 | A  | * | 9/1986 | Kesling .................. | B62D 33/02 296/183.1 |
| 4,917,435 | A  | * | 4/1990 | Bonnett ............... | B62D 29/043 296/190.08 |
| 4,944,612 | A  |   | 7/1990 | Abstetar et al. | |
| 5,660,427 | A  | * | 8/1997 | Freeman ................ | B62D 33/02 296/183.1 |
| 6,695,394 | B2 | * | 2/2004 | Takahashi ............ | B62D 25/087 296/26.11 |
| 6,742,832 | B1 | * | 6/2004 | Miskech ................ | B62D 33/02 216/36 |
| 7,588,285 | B2 |   | 9/2009 | Mohammed | |
| 7,766,416 | B2 | * | 8/2010 | McClure ................ | B62D 33/00 296/183.1 |

(Continued)

FOREIGN PATENT DOCUMENTS

WO    WO 2009/115739    *    3/2009

*Primary Examiner* — Gregory A Blankenship
(74) *Attorney, Agent, or Firm* — Vichit Chea; Carlson, Gaskey & Olds, P.C.

(57) ABSTRACT

A method of assembling a unibody vehicle includes securing a cab back panel of a cab back panel directly to an upturned flange of a cargo box floor. A unibody vehicle assembly according to another exemplary aspect of the present disclosure includes, among other things, a cab back panel, a cargo box floor, and a passenger compartment floor. The cab back panel is secured directly to the cargo box floor. The cab back panel provides a back wall of a passenger cab and a front wall of a cargo area.

17 Claims, 11 Drawing Sheets

(56) References Cited

U.S. PATENT DOCUMENTS

| | | | |
|---|---|---|---|
| 11,225,289 B2* | 1/2022 | Ogawa | B62D 21/02 |
| 11,299,215 B2* | 4/2022 | Morgans | B62D 33/023 |
| 2003/0011212 A1* | 1/2003 | Hashimoto | B62D 47/003 |
| | | | 296/190.11 |
| 2003/0122401 A1* | 7/2003 | Hashimoto | B62D 25/087 |
| | | | 296/190.11 |
| 2005/0057074 A1* | 3/2005 | Augustine | B62D 25/2054 |
| | | | 296/183.1 |
| 2009/0184540 A1* | 7/2009 | Edwards | B62D 33/0273 |
| | | | 296/183.1 |
| 2010/0072789 A1* | 3/2010 | Boettcher | B62D 33/0273 |
| | | | 296/209 |
| 2021/0245819 A1* | 8/2021 | Simonin | B62D 33/02 |
| 2021/0370744 A1* | 12/2021 | Gray | B60H 1/00378 |
| 2022/0055697 A1* | 2/2022 | Morgans | B62D 33/077 |
| 2022/0097778 A1* | 3/2022 | Syed | B62D 33/06 |

* cited by examiner

UNIBODY VEHICLE CAB BACK ASSEMBLY AND METHOD

TECHNICAL FIELD

This disclosure relates generally to a unibody vehicle and, more particularly, to securing a cab back panel of a unibody pickup truck.

BACKGROUND

A typical pickup truck body has a separate cab, box, and vehicle frame. The cab and box are attached to the vehicle frame. A unibody pickup truck does not have a vehicle frame that is separate from a cab and a box. In a unibody pickup truck, a back panel of the cab can provide a front wall of the box. Some unibody pickup trucks attach the back panel of the cab directly to a floor of the cab.

SUMMARY

A method of assembling a unibody vehicle includes securing a cab back panel of a cab back panel directly to an upturned flange of a cargo box floor.

A further exemplary embodiment of the foregoing method includes, after the securing, fastening a first body side assembly to a first lateral side of the cab back assembly, and a second body side assembly to a second lateral side of the cab back assembly.

A further exemplary embodiment of any of the foregoing methods includes, after securing the cab back panel to the cargo box floor, securing a cab back cross-member of the cab back assembly to the cab back panel.

In a further exemplary embodiment of any of the foregoing methods, the cab back cross-member has a box-style cross-sectional profile.

In a further exemplary embodiment of any of the foregoing methods, the fastening of the first and second body side assemblies is before the securing of the cab back cross-member of the cab back assembly.

In a further exemplary embodiment of any of the foregoing methods, the upturned flange and the cab back panel interface with each other along a vertically extending interface.

In a further exemplary embodiment of any of the foregoing methods, the cargo box floor extends from a first side of the cab back panel to an opposite, second side of the cab back panel. The upturned flange of the cargo box floor is disposed forward the cab back panel when the cab back panel is secured to the upturned flange.

A further exemplary embodiment of any of the foregoing methods includes securing a passenger compartment floor directly to the upturned flange of the cargo box floor, the cab back panel of the cab back assembly secured directly to a first side of the upturned flange, the passenger compartment floor secured directly to an opposite, second side of the upturned flange.

In a further exemplary embodiment of any of the foregoing methods, an upturned flange of the passenger compartment floor is secured directly to the upturned flange of the cargo box floor. At least one weld extends through the cab back panel of the cab back assembly, the upturned flange of the cargo box floor, and the upturned flange of the passenger compartment floor.

In a further exemplary embodiment of any of the foregoing methods, a cab back cross-member of the cab back assembly is separate from the cab back panel when the cab back panel is secured directly to the cargo box floor.

A further exemplary embodiment of any of the foregoing methods includes, after securing the cab back panel of the cab back assembly directly to the cargo box floor, securing a front panel of an upper portion of the cab back assembly to the cab back panel and then securing a rear panel of the upper portion of the cab back assembly to the cab back panel.

In a further exemplary embodiment of any of the foregoing methods, a cab back cross-member of the cab back assembly is secured to the cab back panel when the cab back panel is secured directly to the cargo box floor.

In a further exemplary embodiment of any of the foregoing methods, the cab back cross-member includes a front panel and a rear panel that form a box section.

In a further exemplary embodiment of any of the foregoing methods, the cab back cross-member includes a front panel. The method further includes securing a rear panel to the front panel after securing the cab back panel directly to the cargo box floor.

In a further exemplary embodiment of any of the foregoing methods, the front panel and the rear panel of the upper portion provide a box section.

A unibody vehicle assembly according to another exemplary aspect of the present disclosure includes, among other things, a cab back panel of a cab back assembly, a cargo box floor, and a passenger compartment floor. The cab back panel is secured directly to the cargo box floor. The cab back panel provides a back wall of a passenger cab and a front wall of a cargo area.

In another example of the foregoing assembly, the cab back panel is secured directly to an upturned flange of the cargo box floor.

In another example of the foregoing assembly, the upturned flange of the cargo box floor is secured directly to the passenger compartment floor such that the upturned flange is sandwiched between the cab back panel the passenger compartment floor.

In another example of any of the foregoing assemblies, the cab back panel, the cargo box floor, and the passenger compartment floor are within a vehicle having a unibody construction.

A further exemplary embodiment of any of the foregoing methods includes a cab back cross-member of the cab back assembly, the cab back cross-member providing a box section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

In unibody vehicles, a cab back can provide the front wall of a cargo box. Assembling the cab back can be difficult. Among other things, maneuvering assembly tools, such as welding electrodes, to positions appropriate for securing the cab back in an installed position can be challenging. This disclosure details exemplary methods of securing a cab back assembly within a unibody vehicle.

Figure 1:
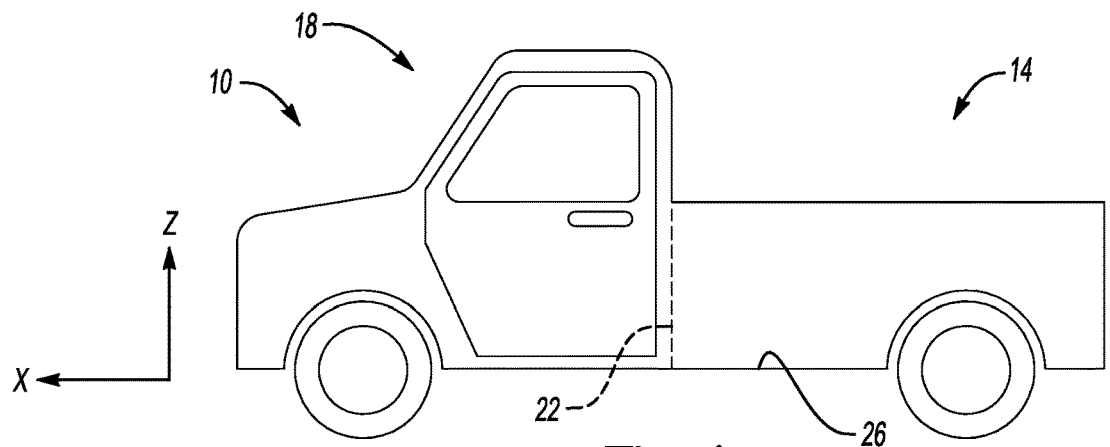
FIG. 1 schematically illustrates a unibody pickup truck.

With reference to FIG. 1, a vehicle 10 includes a cargo box 14 and a cab 18. The vehicle 10 is a unibody pickup truck. As the vehicle 10 has a unibody configuration, the cargo box 14 and the cab 18 are not supported on a vehicle frame separate from the cargo box 14 and the cab 18.

In conventional body-on-frame vehicles, a back wall of a cab is spaced a distance from a front wall of a cargo box. In the vehicle 10, a cab back assembly 22 provides a back wall of the cab 18 and a front wall of the cargo box 14. The cab back assembly 22, in the exemplary embodiment, is an assembly that is joined directly to a cargo box floor 26 of the cargo box 14.

With reference now to FIGS. 2A-3B and continuing reference to FIG. 1, the cab back assembly 22 includes a cab back panel 30 and a cab back cross-member 34. In the exemplary embodiment, the cab back panel 30 is a single sheet of material whereas the cab back cross-member 34 has a box section construction.

To assemble the cab back assembly 22 within the vehicle 10, the cab back panel 30 is first moved in an X direction and secured directly to the cargo box floor 26. The cargo box floor 26 is secured to a passenger compartment floor 38, which is a floor of the cab 18. The cab back panel 30 can have a part-in-assembly (PIA) design.

In this example, the cargo box floor 26 includes an upturned flange 42. The cab back panel 30 can be welded to the upturned flange 42 to secure the cab back panel 30 to the cargo box floor 26. This securing can be via a plurality of spot welds. The securing of the cab back panel 30 occurs during the underbody mainline portion of assembly of the vehicle 10.

As the upturned flange 42 is upturned, the cab back panel 30 is secured to the cargo box floor 26 along a vertically extending interface. Keeping the welded interface a vertically extending interface can facilitate robust assembly as the welds securing the upturned flange 42 to the cab back panel 30 can be oriented generally horizontally and thus are more likely in shear than peel when loaded. Along the interface, the upturned flange 42 is forward the cab back panel 30 relative to a general orientation of the vehicle 10.

The cab back panel 30 is secured to a rear side of the upturned flange 42. Thus, the cargo box floor 26 extends from a first rear side of the cab back panel 30 to an opposite, forward second side of the cab back panel 30.

The front side of the upturned flange 42 is secured directly to a flange 44 of the passenger compartment floor 38. The flange 44 can be an upturned flange. The upturned flange 42 is, in the exemplary embodiment, sandwiched between the flange 44 and the cab back panel 30. At least one weld W can extend through the cab back panel 30, the upturned flange 42 of the cargo box floor 26 and the flange 44 of the passenger compartment floor 38 to join together these components. Adhesive and sealers can be introduced along the various interfaces between the components to facilitate sealing the interface.

After securing the cab back panel 30 of the cab back assembly 22 directly to the cargo box floor 26, body side assemblies 46 are secured to a first lateral side of the cab back panel 30 and an opposite section side of the cab back panel 30.

Figure 2A:
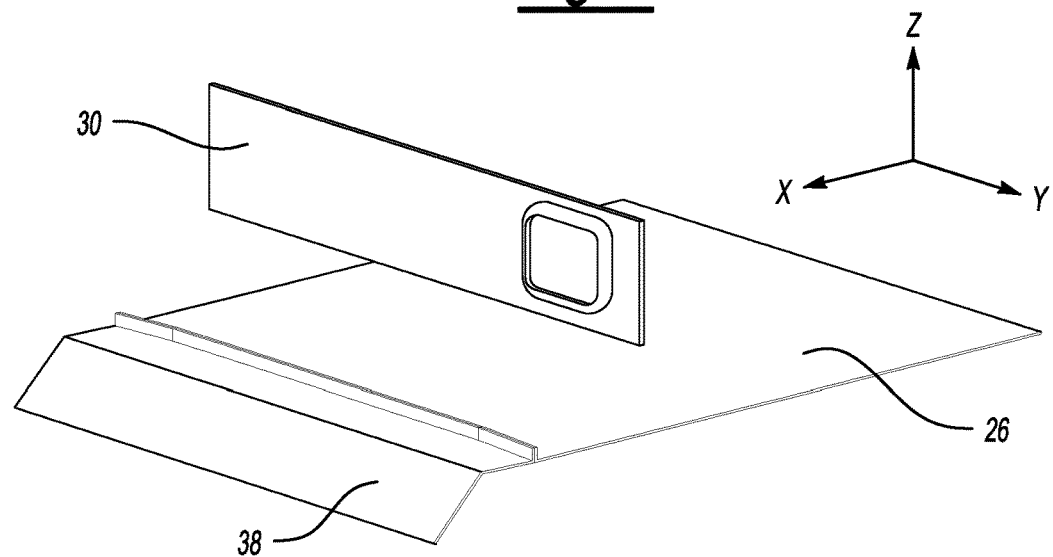
FIGS. 2A-2D illustrate, according to an exemplary embodiment of the present disclosure, selected stages during the assembly of the unibody pickup truck of FIG. 1 and particularly a cab back assembly of the unibody pickup truck.
Figure 2B:
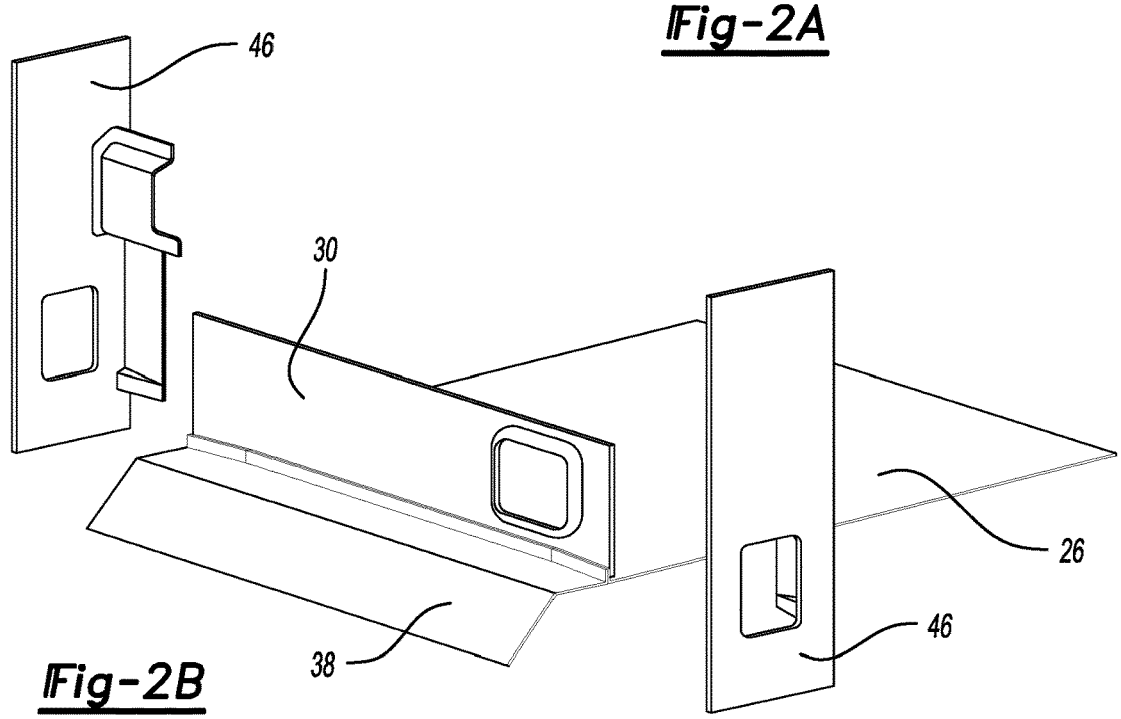

As shown in FIG. 2B, the body side assemblies 46 can be loaded along a Y axis to opposing lateral sides of the cab back panel 30 after the cab back panel 30 is secured to the cargo box floor 26. The cab back panel 30 is thus, notably, secured to the cargo box floor 26 prior to securing of the body side assemblies 46. As the cab back panel 30 is secured prior to the body side assemblies 46, the securing of the cab back panel 30 can occur without interference from the body side assemblies 46.

Figure 2C:
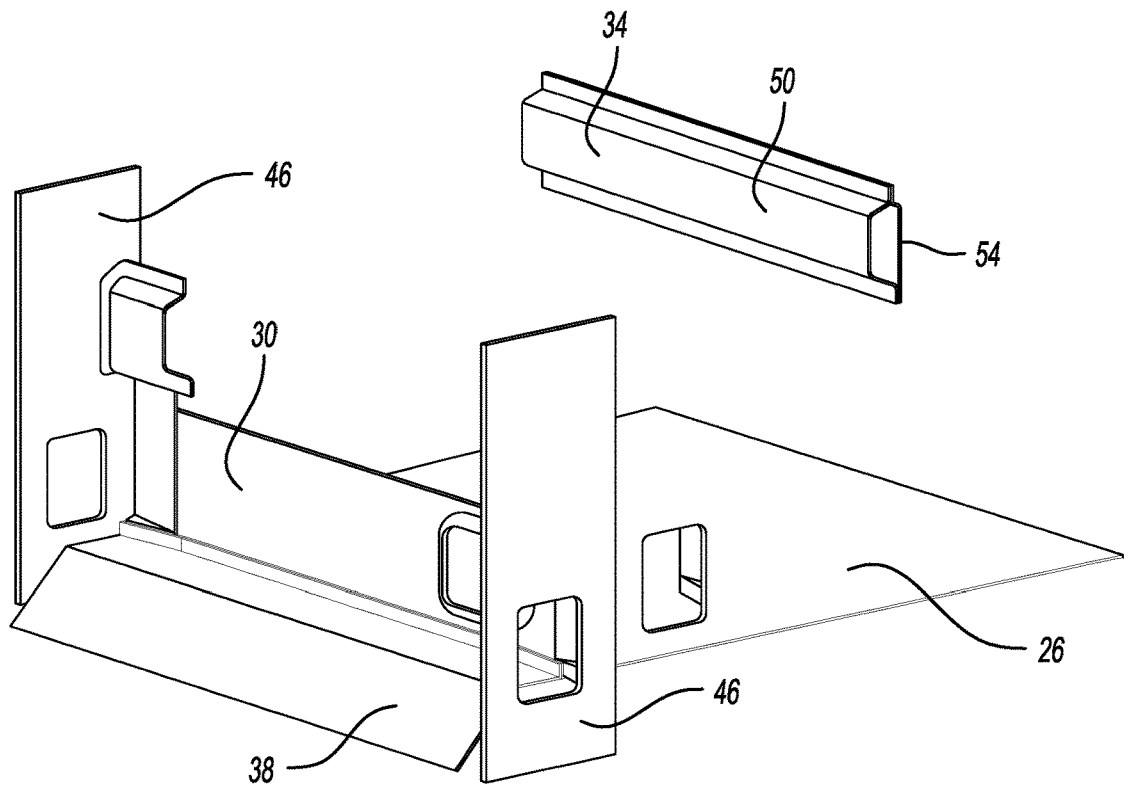
Figure 2D:
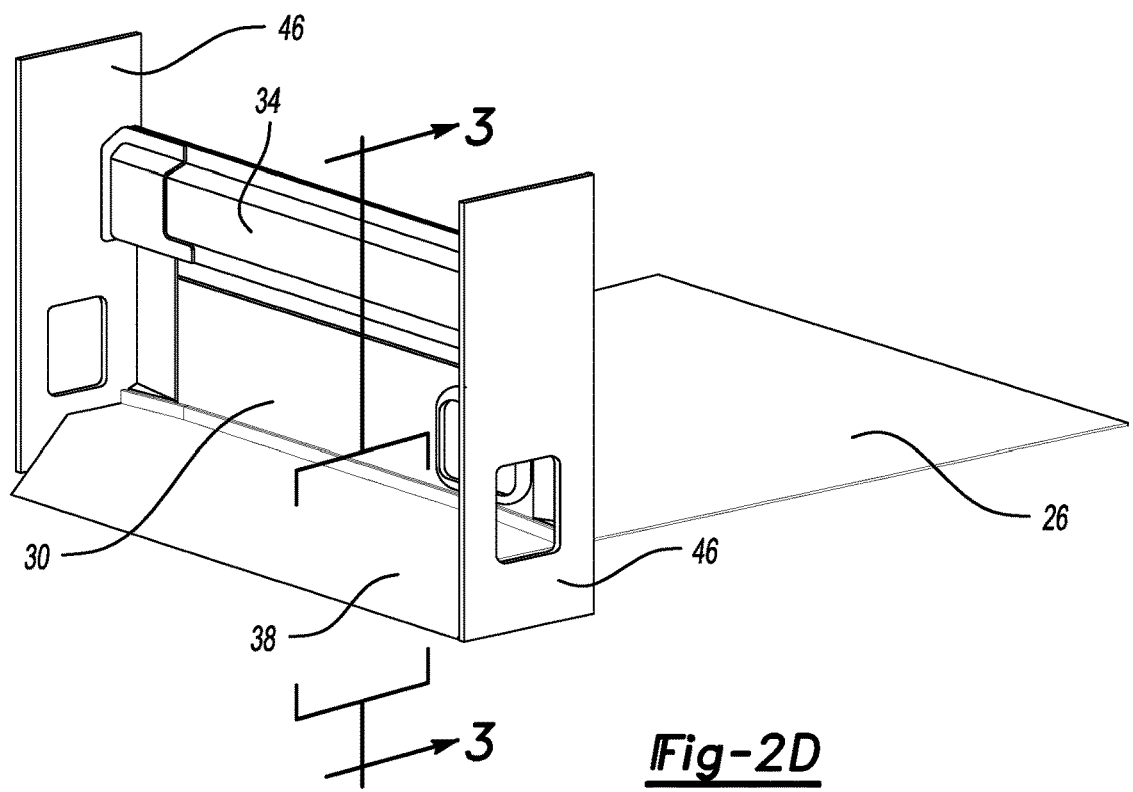
Figure 3:
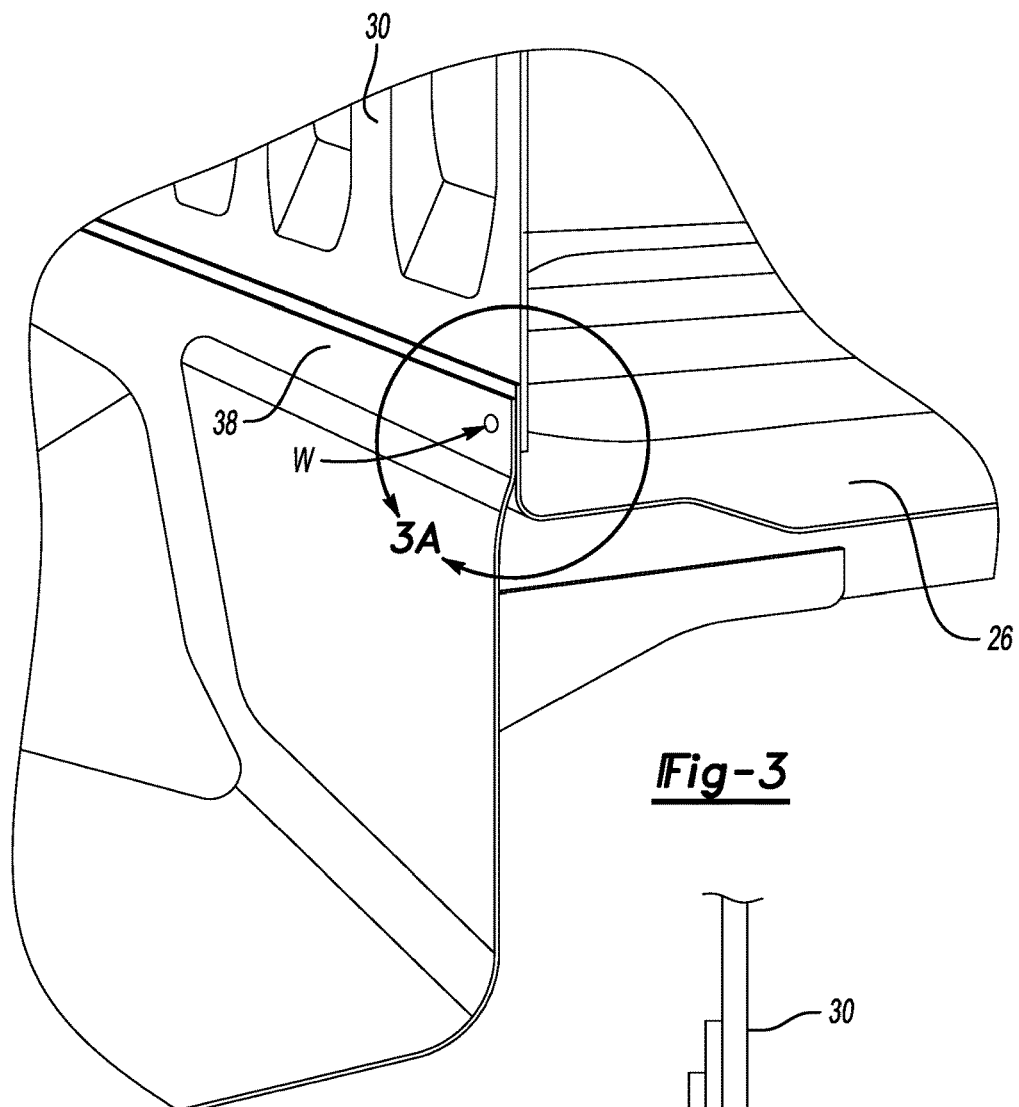
FIG. 3 illustrates a section view taken at line 3-3 in FIG. 2D.
Figure 3A:
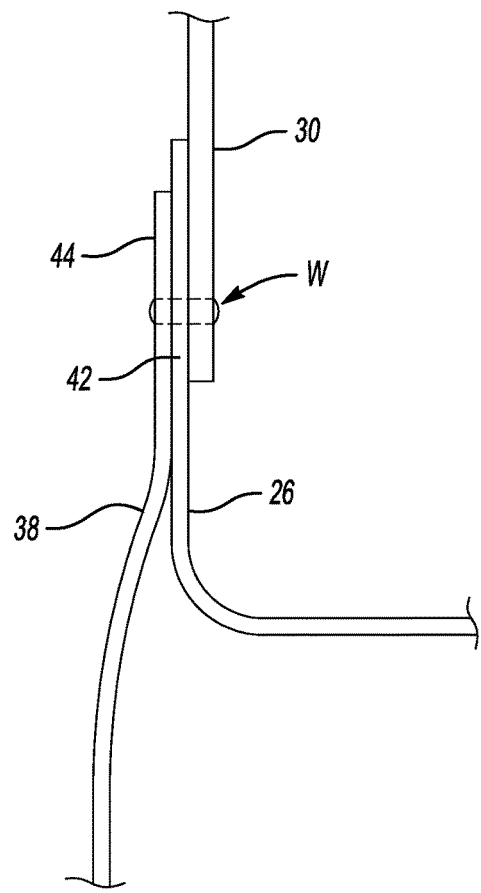
FIG. 3A illustrates a close-up of an area in FIG. 3.

After the securing the body side assemblies 46, the cab back cross-member 34 is loaded in an X direction, as shown in FIG. 2C, and secured to the cab back panel 30 and the body side assemblies 46. The cab back cross-member 34 and cab back panel 30 then provide the back assembly 22 in an installed position as shown in FIG. 2D.

The cab back cross-member 34, in the exemplary embodiment, has a front panel 50 and a rear panel 54 that are joined to provide a box section. Front and rear are with reference to the general orientation of the vehicle 10. The exemplary cab back panel 30, in contrast to the cab back cross-member 34, is a single panel.

With reference now to FIGS. 4A-4E, another exemplary method of assembling the cab back assembly 22 includes securing the cab back panel 30 of the cab back assembly 22 in a manner similar to that described in connections with FIGS. 2A and 2B above. The cab back cross-member 34, however, is assembled differently. Rather than the front panel 50 and rear panel 54 being secured together and then joined to the cab back panel 30 and the body side assemblies 46, the front panel 50 is assembled to the cab back panel 30 and the body side assemblies 46 separately from the rear panel 54.

Figure 4A:
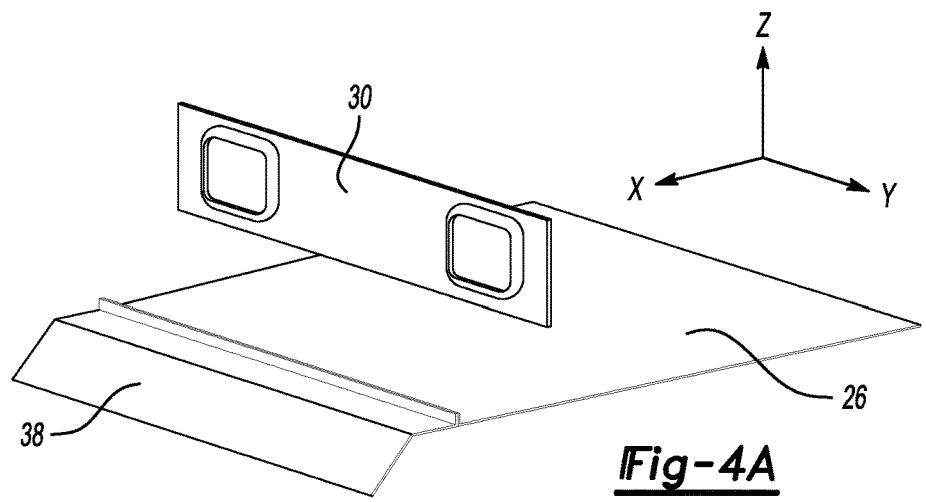
FIGS. 4A-4E illustrate, according to another exemplary embodiment of the present disclosure, selected stages during the assembly of the unibody pickup truck of FIG. 1 and particularly a cab back assembly of the unibody pickup truck.
Figure 4B:
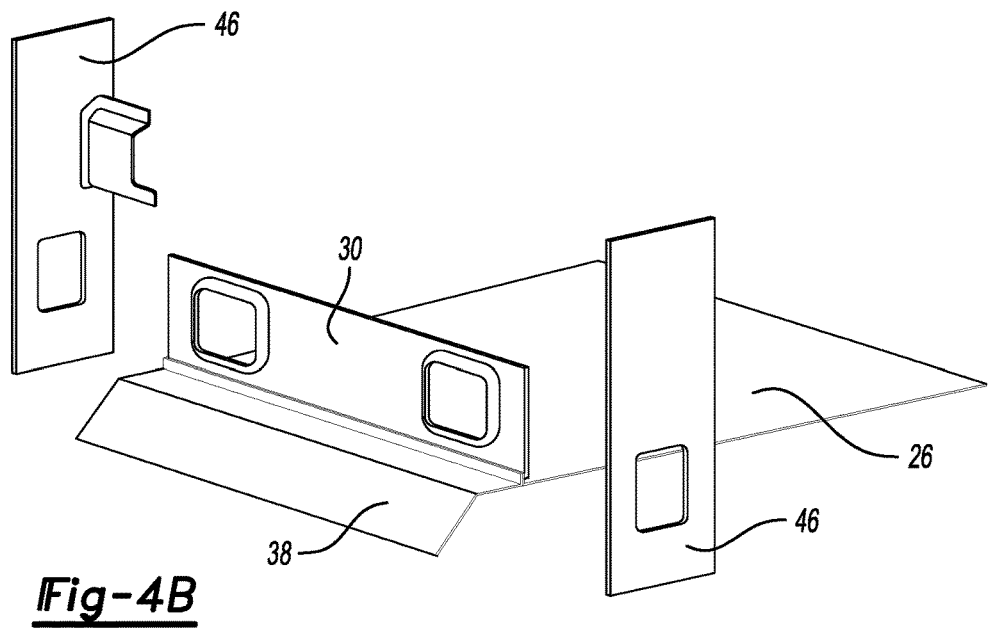
Figure 4C:
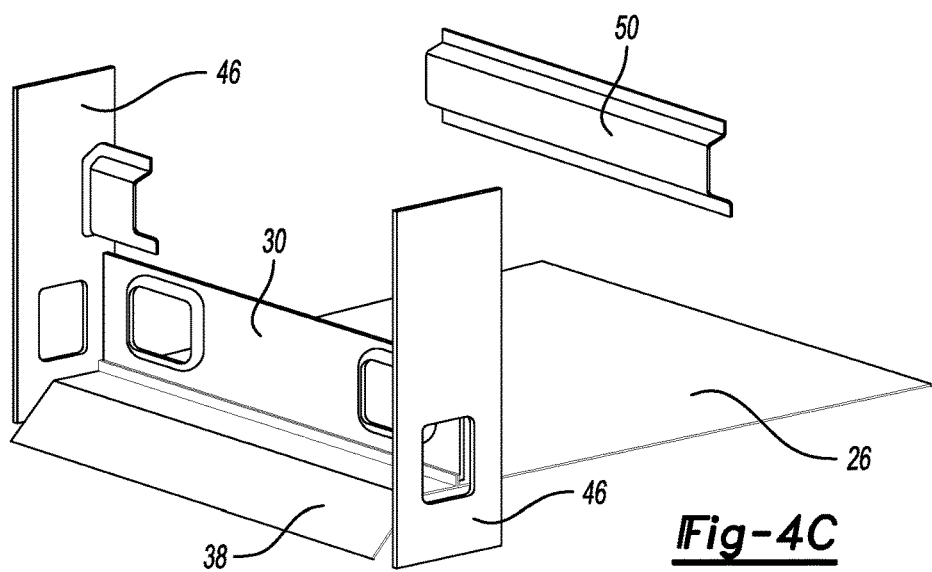
Figure 4D:
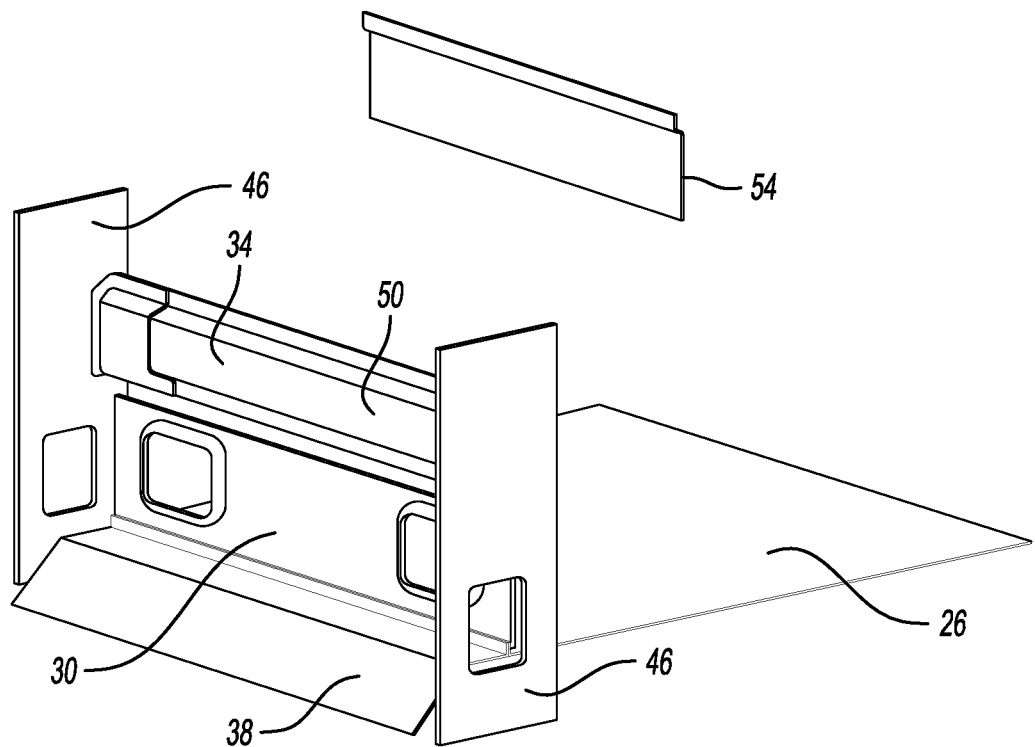
Figure 4E:
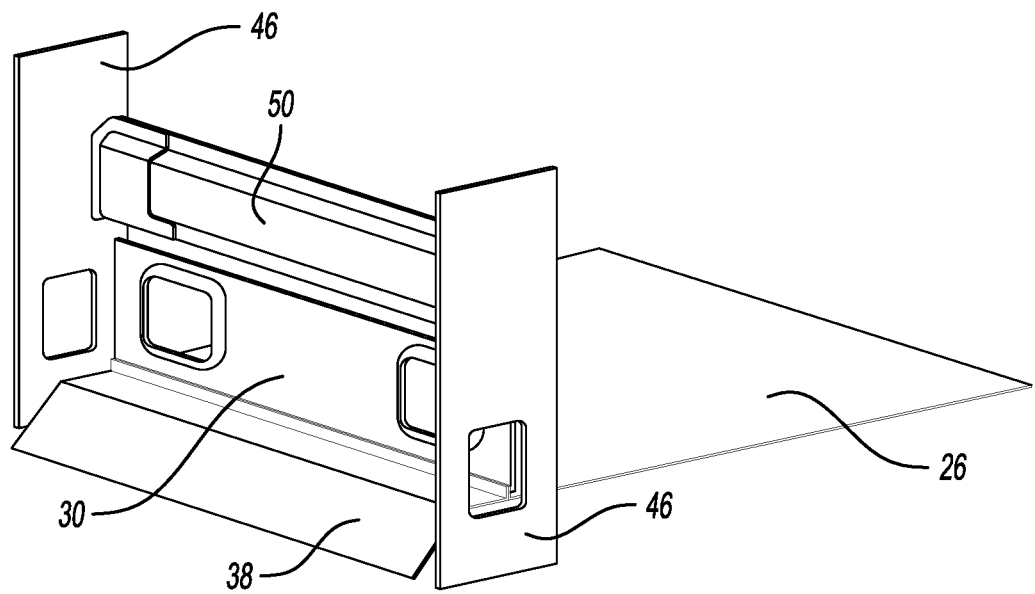

In particular, as shown in FIG. 4C, the front panel 50 of the cab back cross-member 34 is loaded in the X direction and secured to the body side assemblies 46 and the cab back panel 30. As shown in FIG. 4D, the rear panel 54 of the cab back cross-member 34 is then loaded in the X direction and secured to the front panel 50 of the cab back cross-member 34 along with the body side assemblies 46 and the cab back panel 30. This provides the subassembly as shown in FIG. 4E.

As can be appreciated, the primary difference between the method described in connection with FIGS. 2A-2D and the method described in connection with FIGS. 4A-4E is that in the method of FIGS. 2A-2D, the front panel 50 and the rear panel 54 of the cab back cross-member 34 are joined prior to installation and securing to the cab back panel 30. In the method of FIGS. 4A-4E, the front panel 50 is joined to the rear panel 54 after the front panel 50 is joined to the cab back panel 30. The front panel 50 and the rear panel 54 can both be PIA to the assembly plant.

With reference now to FIGS. 5A-5D, yet another exemplary method of securing the cab back assembly 22 includes joining together the cab back panel 30 and the cab back cross-member 34 to provide the cab back assembly 22. The cab back assembly 22 can be PIA to the assembly plant that is assembling the vehicle 10 (FIG. 1).

The cab back assembly 22 is then secured to the cargo box floor 26 and the passenger compartment floor 38, which are part of an underbody structure 56. This provides the assembly shown in FIG. 5B. Like the embodiment of FIG. 2A-2D, the cab back panel 30 is secured directly to the upturned flange 42 of the cargo box floor 26 to secure the cab back assembly 22 to the cargo box floor 26 of the underbody structure 56.

Figure 5A:
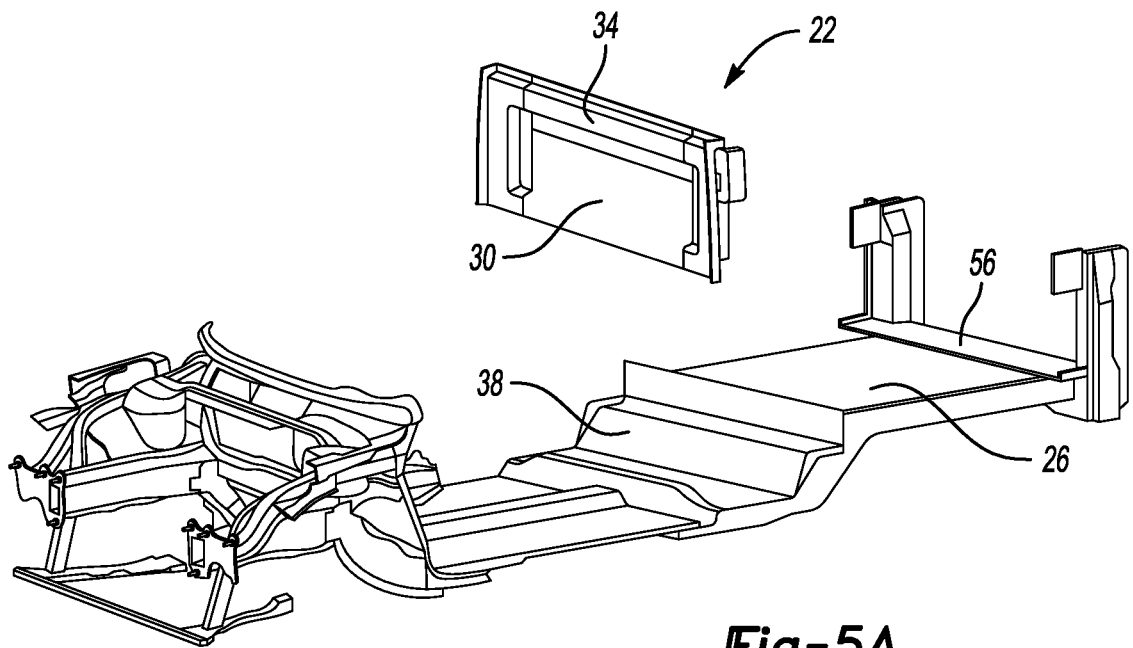
FIGS. 5A-5D illustrate, according to yet another exemplary embodiment of the present disclosure, selected stages during the assembly of the unibody pickup truck of FIG. 1 and particularly a cab back assembly of the unibody pickup truck.
Figure 5B:
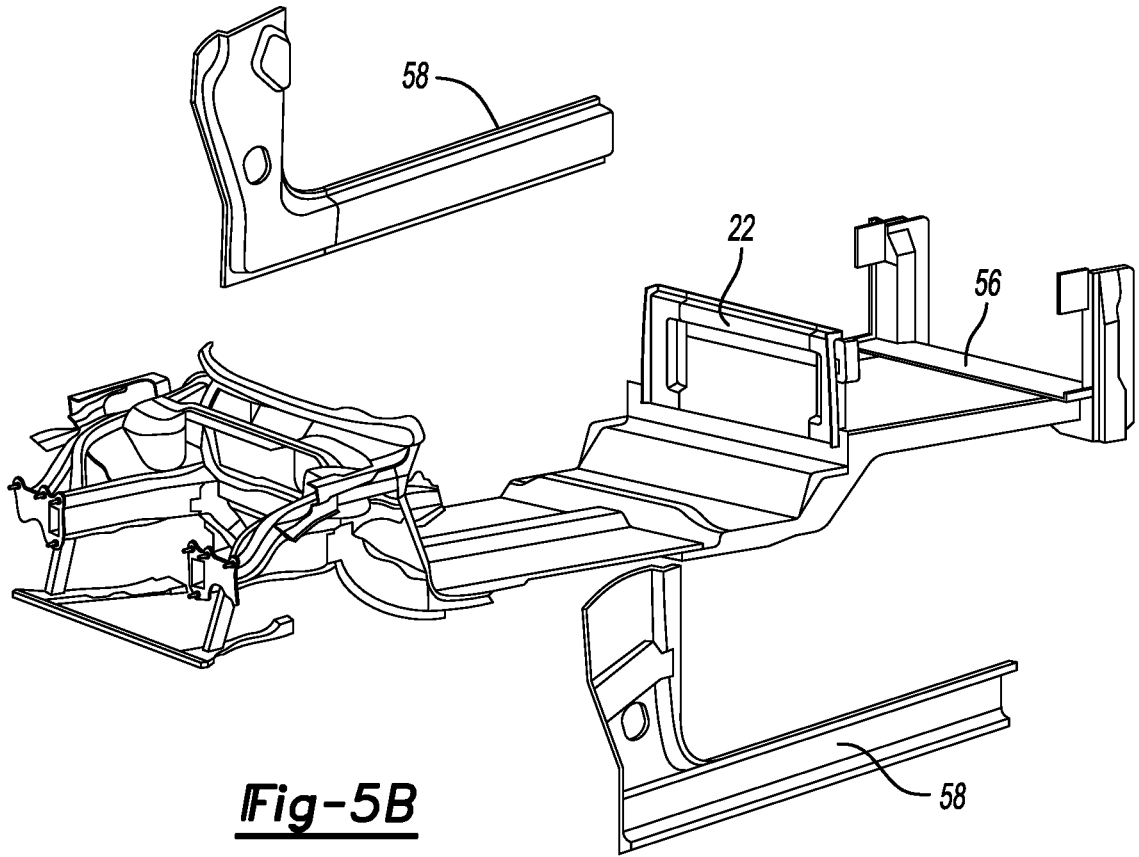
Figure 5C:
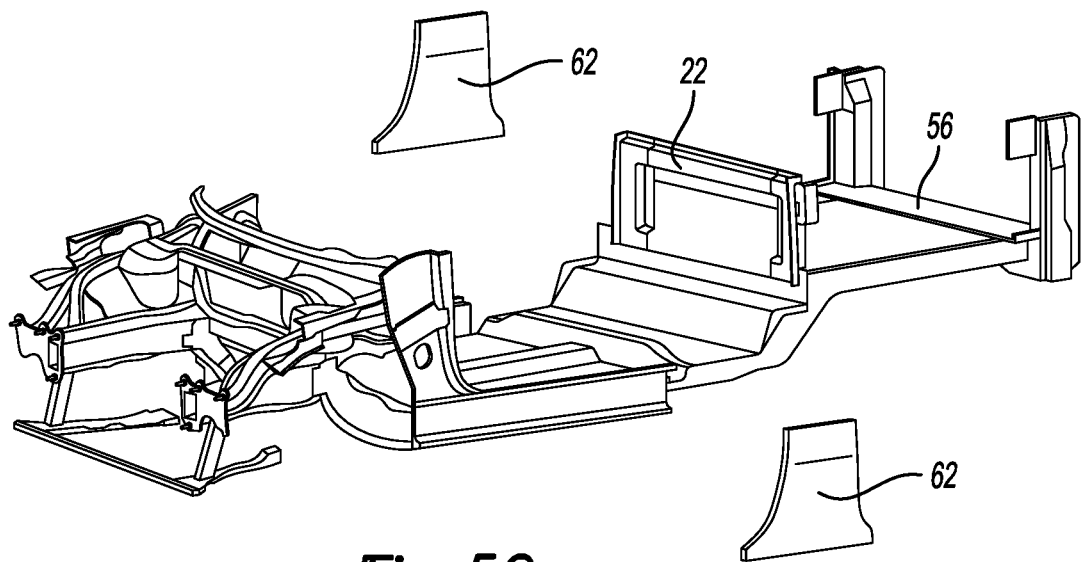
Figure 5D:
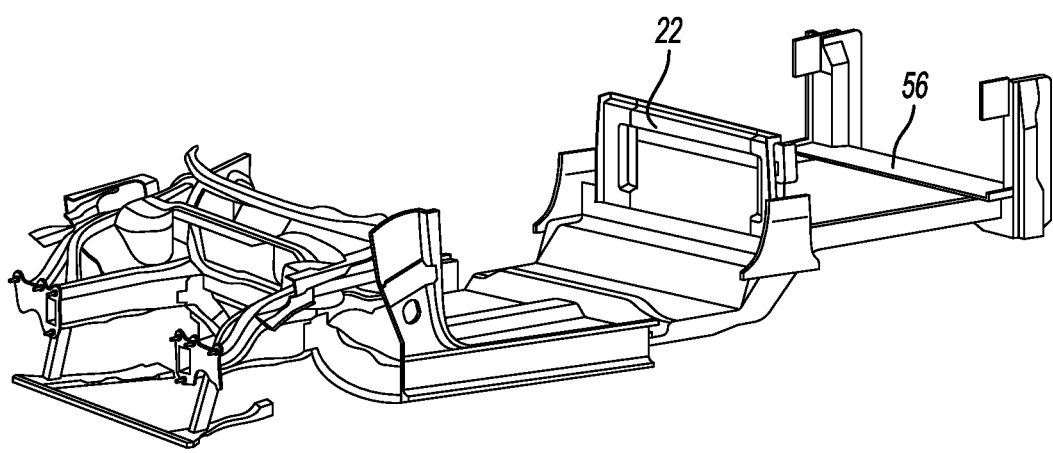

Side assemblies, here, side sill inners 58, or hockey sticks, are then joined to the opposing lateral sides of the underbody structure 56. Next, hockey stick stubs 62 are joined as shown in FIG. 5C to provide the structure shown in 5D, which can then be moved to the framing stage of assembly.

FIGS. 6A-6D show yet another exemplary method of securing the cab back assembly 22. In this example, sides 66 of a vehicle frame assembly are secured to opposing sides of the underbody structure 56, which includes the cargo box floor 26 and the passenger compartment floor 38.

Figure 6A:
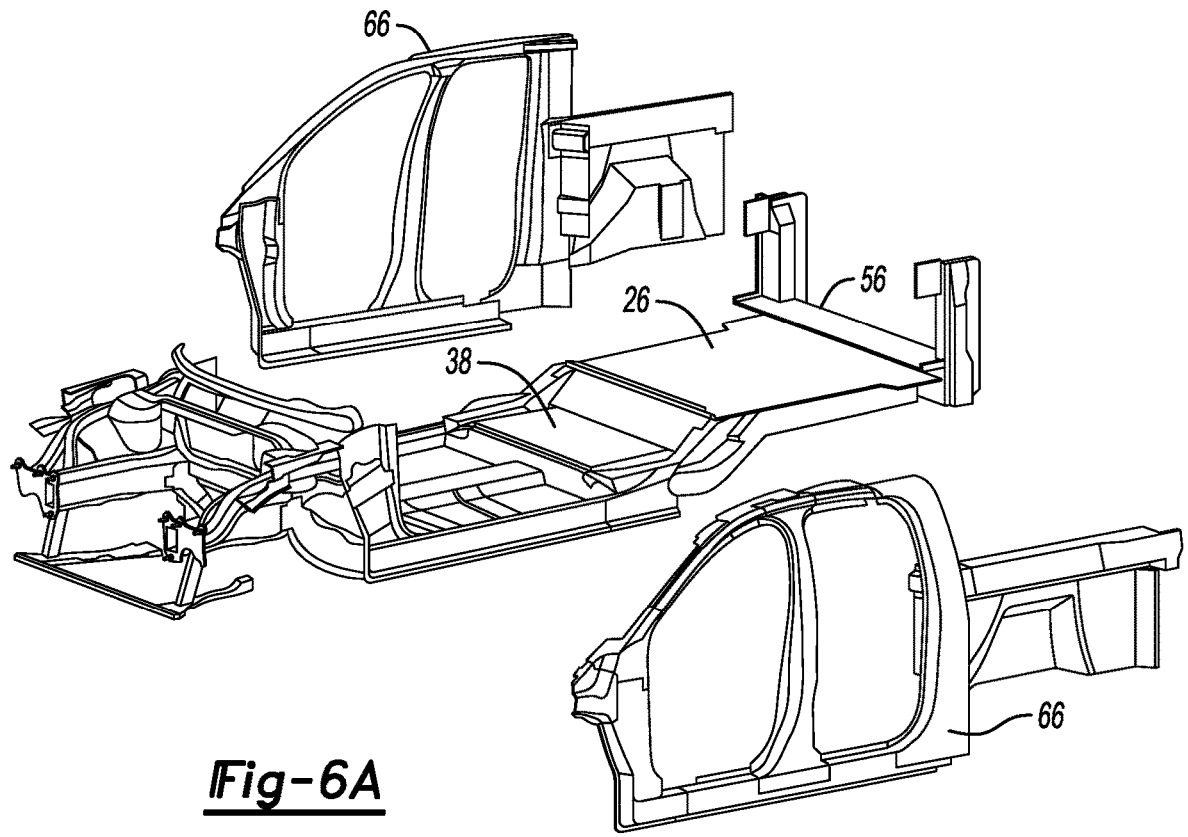
FIGS. 6A-6D illustrate, according to yet another exemplary embodiment of the present disclosure, selected stages during the assembly of the unibody pickup truck of FIG. 1 and particularly a cab back assembly of the unibody pickup truck.
Figure 6B:
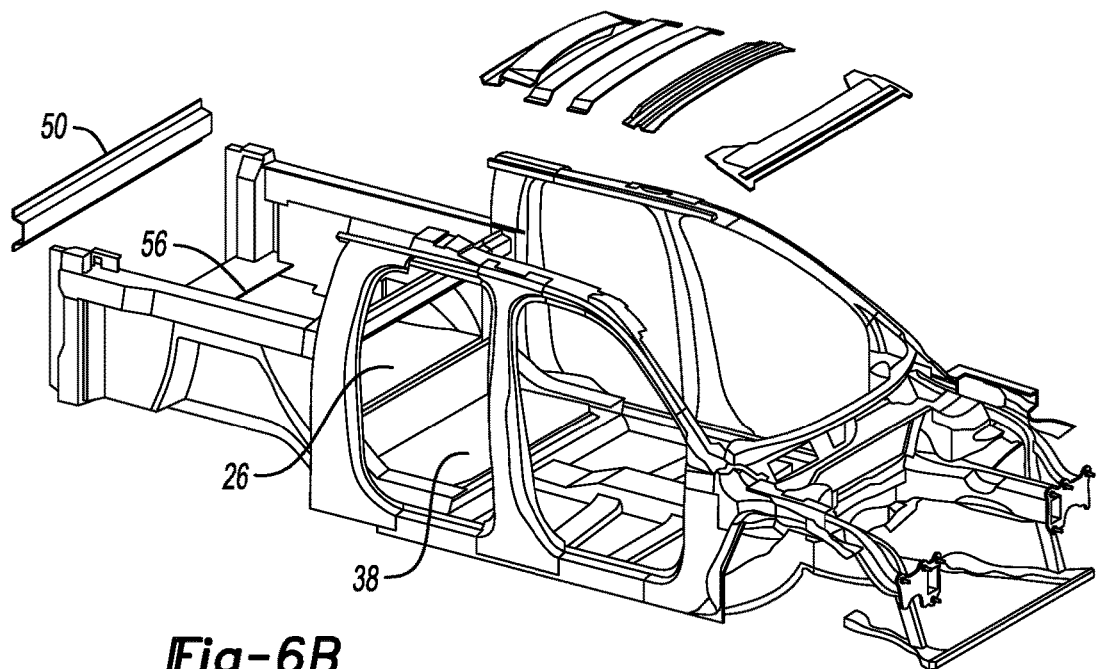

Next, the front panel 50 of the cab back cross-member 34 of the cab back assembly 22 is moved along the X axis and secured to the sides 66 as shown in FIG. 6B. The front panel 50 could be loaded during a framing stage of assembly.

Figure 6C:
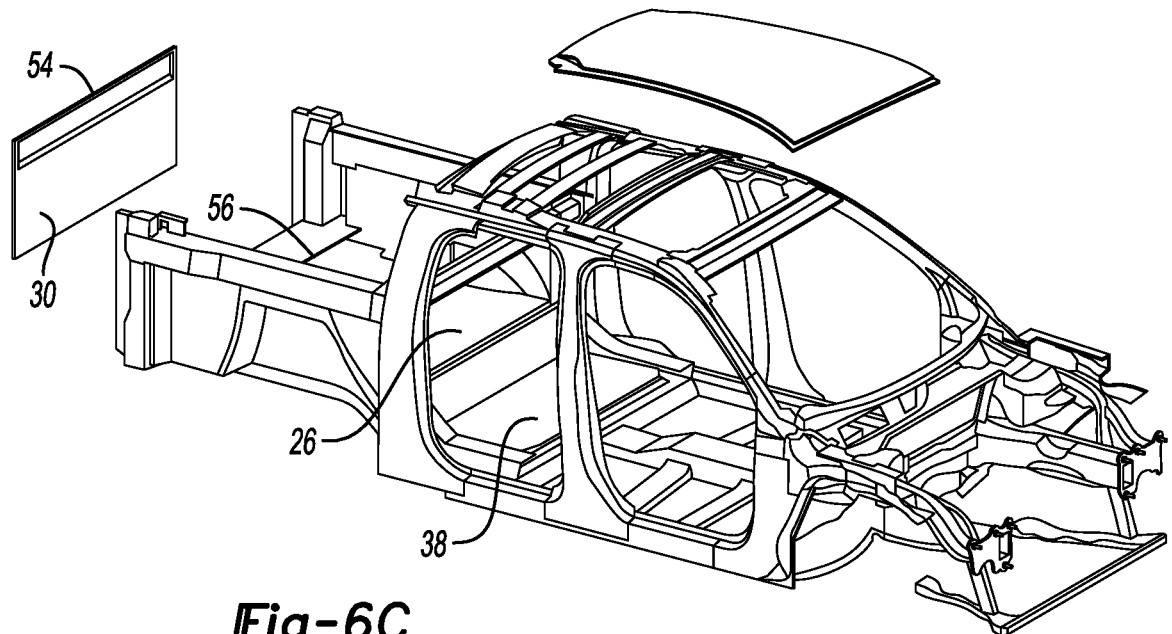
Figure 6D:
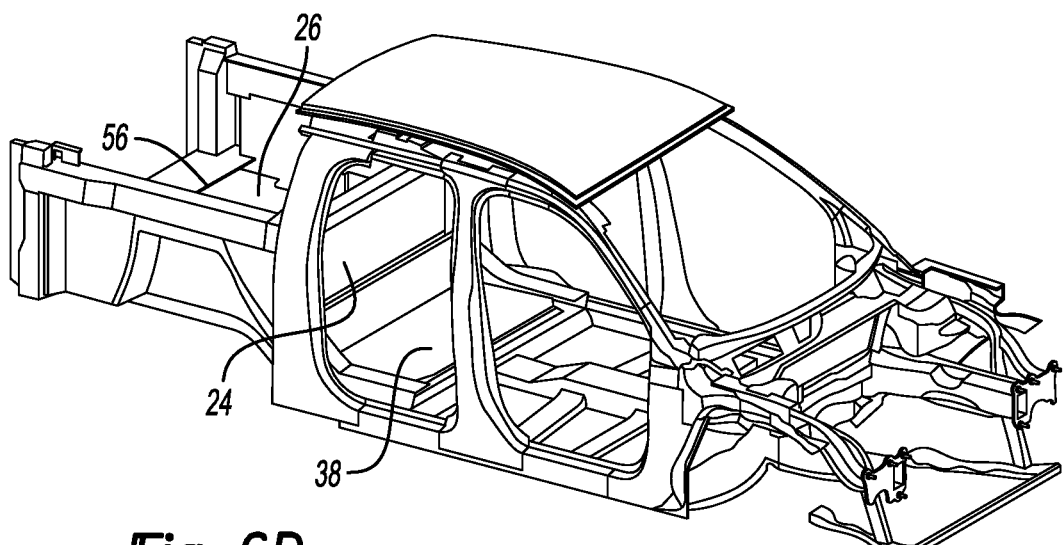
Figure 7A:
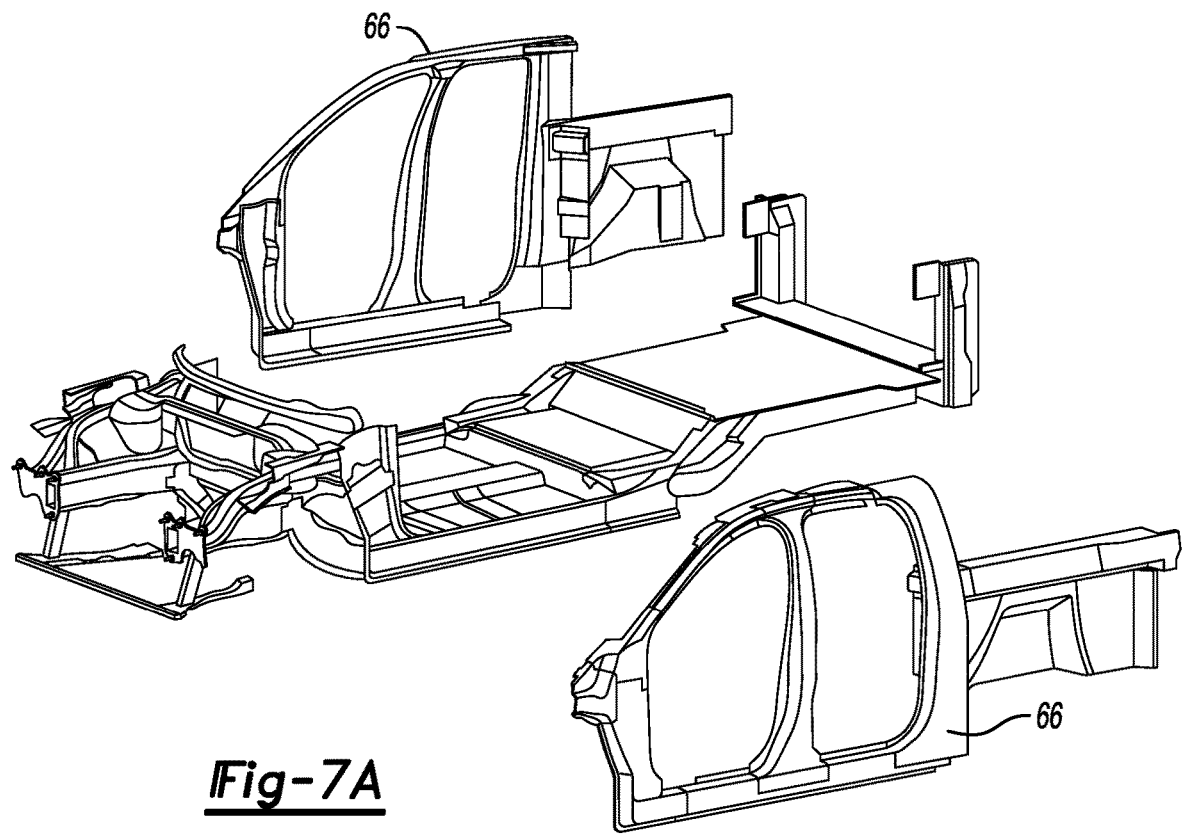
FIGS. 7A-7D illustrate, according to yet another exemplary embodiment of the present disclosure, selected stages during the assembly of the unibody pickup truck of FIG. 1 and particularly a cab back assembly of the unibody pickup truck.
Figure 7B:
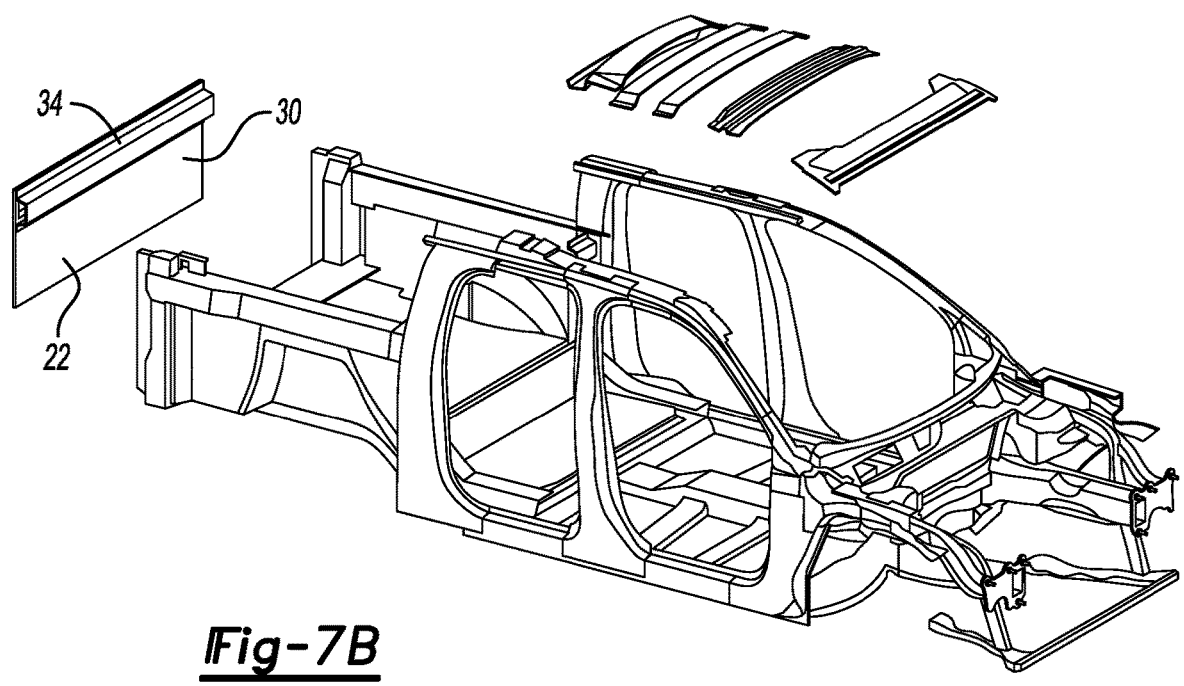
Figure 7C:
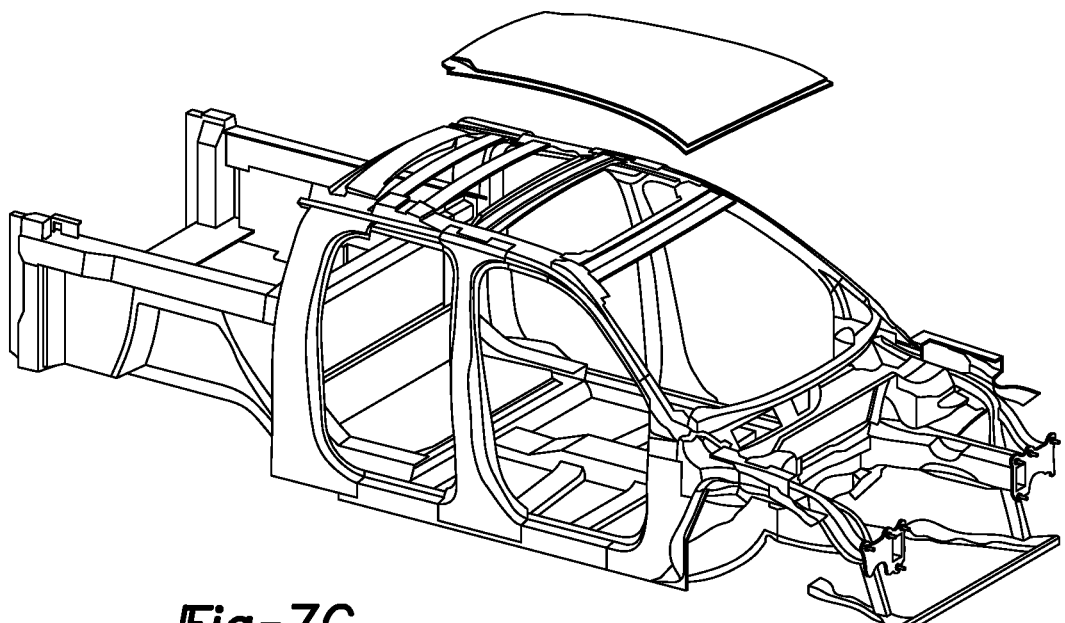
Figure 7D:
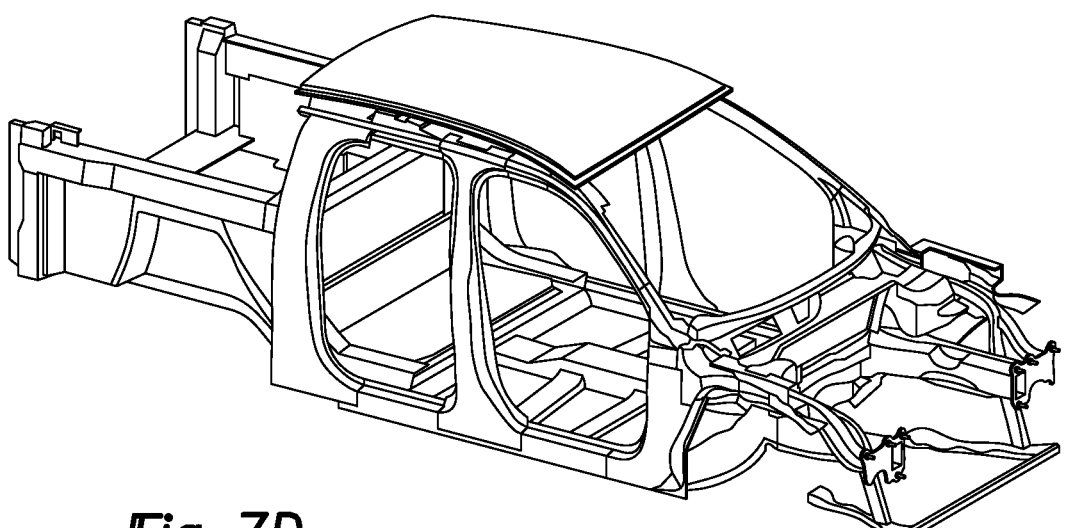

Remaining portions of the cab back assembly 22, which includes the cab back panel 30 and the rear panel 54 of the cab back cross-member 34 are then secured together, moved along the X axis, and then secured as shown in FIGS. 6C and 6D. The cab back panel 30 and rear panel 54 of the cab back cross-member 34 can be a single piece as shown in 6C. That is, the cab back panel 30 and rear panel 54 could be stamped from a single sheet of material and be different areas of a single monolithic structure. Alternatively, the cab back panel 30 and the rear panel 54 could be joined together and then secured as shown in FIGS. 6C and 6D.

In a variation of the method described in FIGS. 6A-6D, the cab back assembly 22 could be PIA and include the cab back panel 30, the front panel 50 of the cab back cross-member 34, and the rear panel 54 of the cab back cross-member 34. The cab back assembly 22 can then be loaded in the step shown in FIG. 6B rather than just the front panel 50 of the cab back assembly 22.

Features of exemplary methods of assembling a cab back panel within a unibody pickup truck include assembling the cab back panel in a way that provides ample clearance for the tools utilized for the securing, such as weld guns, etc.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of assembling a unibody vehicle, comprising:
securing a cab back panel of a cab back assembly directly to an upturned flange of a cargo box floor, wherein the cargo box floor extends from a first rear side of the cab back panel to an opposite, second forward side of the cab back panel.

2. The method of claim 1, after the securing, fastening a first body side assembly to a first lateral side of the cab back assembly, and a second body side assembly to a second lateral side of the cab back assembly.

3. The method of claim 2, further comprising, after securing the cab back panel to the cargo box floor, securing a cab back cross-member of the cab back assembly to the cab back panel.

4. The method of claim 3, wherein the cab back cross-member has a box-style cross-sectional profile.

5. The method of claim 3, wherein the fastening of the first and second body side assemblies is before the securing of the cab back cross-member of the cab back assembly.

6. The method of claim 1, wherein a cab back cross-member of the cab back assembly is separate from the cab back panel when the cab back panel is secured directly to the cargo box floor.

7. The method of claim 1, further comprising, after securing the cab back panel of the cab back assembly directly to the cargo box floor, securing a front panel of an upper portion of the cab back assembly to the cab back panel and then securing a rear panel of the upper portion of the cab back assembly to the cab back panel.

8. The method of claim 1, wherein a cab back cross-member of the cab back assembly is secured to the cab back panel when the cab back panel is secured directly to the cargo box floor.

9. The method of claim 8, wherein the cab back cross-member includes a front panel and a rear panel that form a box section.

10. The method of claim 9, wherein the cab back cross-member includes a front panel and, further comprising, securing a rear panel to the front panel after securing the cab back panel directly to the cargo box floor.

11. The method of claim 10, wherein the front panel and the rear panel provide a box section.

12. A method of assembling a unibody vehicle, comprising:
securing a cab back panel of a cab back assembly directly to an upturned flange of a cargo box floor, wherein the upturned flange and the cab back panel interface with each other along a vertically extending interface, and the cargo box floor extends from a first side of the cab back panel to an opposite, second side of the cab back panel, the upturned flange of the cargo box floor disposed forward the cab back panel when the cab back panel is secured to the upturned flange.

13. The method of claim 12, further comprising securing a passenger compartment floor directly to the upturned flange of the cargo box floor, the cab back panel of the cab back assembly secured directly to a first side of the upturned flange, the passenger compartment floor secured directly to an opposite, second side of the upturned flange.

14. The method of claim 13, wherein an upturned flange of the passenger compartment floor is secured directly to the upturned flange of the cargo box floor, wherein at least one weld extends through the cab back panel of the cab back assembly, the upturned flange of the cargo box floor, and the upturned flange of the passenger compartment floor.

15. A unibody vehicle assembly, comprising:
a cab back panel of a cab back assembly;
a cargo box floor; and
a passenger compartment floor, wherein the cab back panel is secured directly to the cargo box floor, the cab back panel providing a back wall of a passenger cab and a front wall of a cargo area,
wherein the cab back panel is secured directly to an upturned flange of the cargo box floor, and the upturned flange of the cargo box floor is secured directly to the passenger compartment floor such that the upturned flange is sandwiched between the cab back panel the passenger compartment floor.

16. The unibody vehicle assembly of claim 15, wherein the cab back panel, the cargo box floor, and the passenger compartment floor are within a vehicle having a unibody construction.

17. The unibody vehicle assembly of claim 15, further comprising a cab back cross-member of the cab back assembly, the cab back cross-member providing a box section.

\* \* \* \* \*

UNITED STATES PATENT AND TRADEMARK OFFICE
CERTIFICATE OF CORRECTION

PATENT NO. : 11,414,138 B2
APPLICATION NO. : 17/036078
DATED : August 16, 2022
INVENTOR(S) : Musheeruddin Zubair Syed et al.

It is certified that error appears in the above-identified patent and that said Letters Patent is hereby corrected as shown below:

In the Claims

In Claim 10, Column 6, Line 38; replace "claim 9" with --claim 1--

Signed and Sealed this
First Day of November, 2022

Katherine Kelly Vidal
*Director of the United States Patent and Trademark Office*